United States Patent

[11] 3,584,282

| [72] | Inventors | John R. Reeves<br>Trafford;<br>Bruce R. Dow, Monroeville; Francis T.<br>Thompson, Murrysville, all of, Pa. |
|---|---|---|
| [21] | Appl. No. | 811,743 |
| [22] | Filed | Apr. 1, 1969 |
| [45] | Patented | June 8, 1971 |
| [73] | Assignee | Westinghouse Electric Corporation<br>Pittsburgh, Pa. |

[54] CURRENT LIMITING SYSTEM FOR MOTOR CONTROL
12 Claims, 2 Drawing Figs.

| [52] | U.S. Cl. | 318/332,<br>318/345, 318/434 |
|---|---|---|
| [51] | Int. Cl. | H02p 5/00 |
| [50] | Field of Search | 318/332,<br>434, 345 |

[56] References Cited
UNITED STATES PATENTS

| 3,050,672 | 8/1962 | Alexanderson | 318/332 |
| 3,214,667 | 10/1965 | Foster et al. | 318/332 |
| 3,308,307 | 3/1967 | Moritz | 307/88.5 |
| 3,465,227 | 9/1969 | Ivie | 318/434 |

*Primary Examiner*—Oris L. Rader
*Assistant Examiner*—K. L. Crosson
*Attorneys*—F. H. Henson, C. F. Renz and A. S. Oddi

ABSTRACT: A system is disclosed for limiting the current to a motor operative with the controlled power supply including controlled rectifier devices for converting an AC input to a DC output wherein a firing circuit is provided which generates firing pulses for controlling the conductive period of the controlled rectifiers when a base voltage having a sawtooth voltage superimposed thereon exceeds a predetermined value. A current indicative of the magnitude of the actual current through the motor is sensed and is utilized to control the magnitude of the base voltage whenever the sensed current exceeds a preselected magnitude so that the current through the motor is limited to safe values. Whenever the sensed current exceeds the preselected value by a predetermined larger amount, a fast response circuit is utilized to remove quickly the overcurrent condition from the motor.

CURRENT LIMITING SYSTEM FOR MOTOR CONTROL

BACKGROUND OF THE INVENTION

1. Field of the Invention

The present invention relates to current limiting systems and, more particularly, to current limiting systems for use with motor controls for limiting motor current to within predetermined limits.

2. Discussion of the Prior Art

A commonly used technique for controlling the current to a DC motor is through a phase controlled power supply including controlled switching devices, such as, silicon controlled rectifiers or thyristors. A pair of controlled switching devices are typically connected in a bridge array with a pair of regular diodes, with AC being supplied as the input to the bridge and a full-wave rectified DC output being taken therefrom. The magnitude of the DC output of the bridge array is selected by controlling the phase angle in each half cycle of the AC at which the controlled switching devices are turned on. By firing the controlled switching devices early in the half cycle, a larger DC output may be obtained and by delaying the phase angle at which the controlled switching devices are fired, a smaller DC output may be obtained. Thus, the magnitude of the current applied to the armature of a DC motor connected across the bridge array may be controlled by varying the phase angle at which the controlled switching devices are fired.

If the current through the armature of the motor should rise above safe limits, due to, for example, the rotor of the motor locking, this would be destructive of the controlled switching devices and diodes of the bridge array and possibly the motor armature unless the overcurrent condition is quickly removed or limited. A common prior art method for compensating for the overcurrent condition is to connect a series resistor between the bridge array and the motor armature and to utilize the voltage generated thereacross for delaying the firing angle at which the controlled switching devices of the bridge array are fired so that the DC output of the power supply is lowered. The requirement for a resistor capable of carrying the armature current necessitates the use of a resistor having a relatively large physical size. Also, the series resistor reduces the overall efficiency of the system due to the heat losses in the resistor. Moreover, poor voltage regulation of the motor results in that the armature resistance appears to be increased by the series resistor. Another serious disadvantage of such a system is that the motor system may become highly unstable if it reacts very rapidly even to minor overload conditions to curtail quickly the current through the motor. Conversely, if the system reacts too slowly to overcurrent conditions, damage may result to the devices of the bridge array and the armature itself before corrective action is taken.

SUMMARY OF THE INVENTION

Broadly the present invention provides a current limiting system for a motor supplied from a controlled power supply including controlled switching devices wherein when an excessive current is sensed corrective action is taken to control the firing times of the controlled switching devices so that the current is held within safe limits.

DESCRIPTION OF THE PREFERRED EMBODIMENT

Figure 1:
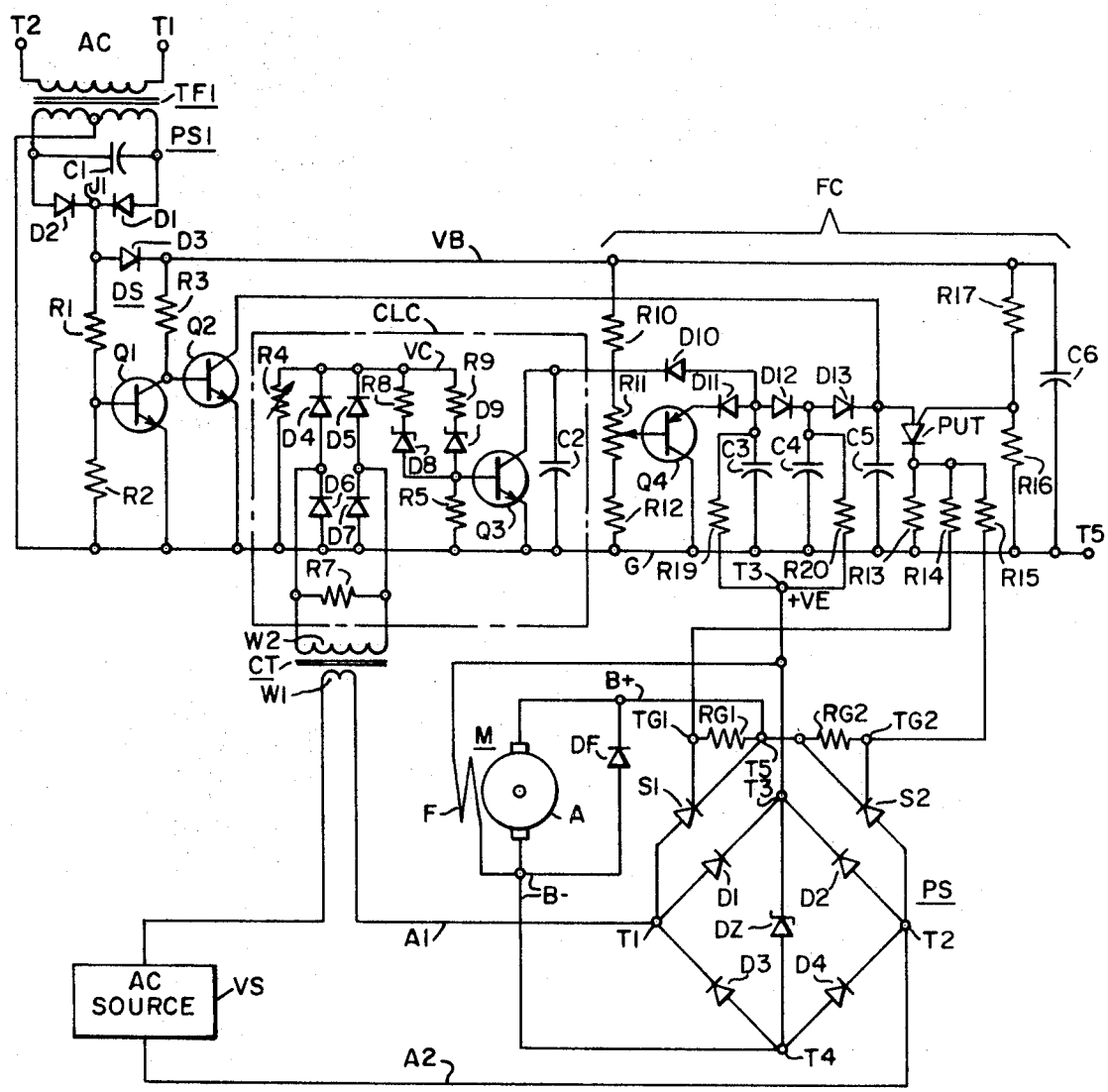
FIG. 1 is block-schematic diagram of the current limiting system of the present invention.

Referring to FIG. 1, the current limiting system of the present invention is shown for limiting current through the armature A of a motor M which also includes a field winding F. The input supply for the system is an AC source VS, which may for example supply a 60 Hz. sinusoidal output of a suitable voltage for the system of for example 220 volts RMS. The output of the AC source VS is connected via leads A1 and A2, respectively, to input terminals T1 and T2 of phase controlled power supply PS. The power supply PS is connected in a bridge array and includes a pair of controlled switching devices S1 and S2, which may comprise silicon controlled rectifiers or thyristors, and four diodes D1, D2, D3 and D4 arranged in a standard full-wave rectifier bridge. The rectifier bridge diodes D1, D2, D3 and D4 are connected between the inputs terminals T1 and T2 and a pair of output terminals T3 and T4, with a surge suppressor device DZ being connected between the output terminals T3 and T4 to chop spikes generated by the supply or the field. The voltage +VE is connected across the field winding F to supply field current thereto for the motor M from the terminals T3 and T4.

The controlled switching device S1 is connected from anode to cathode between the input terminal T1 and an output terminal T5, and the controlled switching device S2 is connected from anode to cathode between the input terminal T2 and the output terminal T5. The terminal T5 is connected via a positive bus B+ to the top side of the armature A of the motor M and the terminal T4 is connected via a negative bus B− to the bottom side of the armature A. When either of the controlled switching devices S1 or S2 is conductive, a current path is provided from the AC source VS therethrough to energize the armature A of the motor M with a unidirection current flowing from top to bottom of the armature A.

The gate electrodes of the controlled switching devices S1 and S2 are supplied with gate terminals TG1 and TG2, respectively. A resistor RG1 is connected between the gate and cathode electrodes of the device S1 and a resistor RG2 is connected between the gate and cathode electrodes of the device S2.

The devices S1 and S2 are nonconductive until gated on by the respective gating signals applied to the terminals TG1 and TG2 which are supplied from a firing circuit FC to be discussed below. Thus during the positive half cycle of the AC source VS, the controlled switching device S1 is nonconductive until a predetermined phase angle in the half cycle has been reached. At this predetermined phase angle a firing signal is provided to the gate electrode thereof which turns on the device S1 and permits it to translate current therethrough to the armature A. At the end of the positive half cycle, the device S1 is commutated off. During the negative half cycle of the AC source VS, the device S2 is nonconductive until the predetermined phase angle is reached and then is gated on at this phase angle by a firing pulse applied to the gate electrode thereof from the firing circuit VS which causes the device S2 to be conductive for the remainder of the negative half cycle. At the end of the negative half cycle the device S2 is commutated off. A freewheeling diode DF is connected from cathode to anode between the B− and B+ buses in order to insure that the respective controlled switching devices S1 and S2 are commutated off at the ends of positive and negative half cycles respectively. The freewheeling diode DF is required since the inductance of the armature A at the end of a half cycle causes the current therethrough to try to continue flowing in the same direction. This would mean that current would continue to flow through either the device S1 or S2 at the end of the half cycle at which it is to be turned off due to this inductance. The freewheeling DF provides a shunt path across the terminals T4 and T5 of the power supply PS thereby diverting current away from the controlled switching device S1 or S2 and so permitting the respective device to turn off at the end of the positive or negative half cycle during which it had been conductive. If a controlled switching device S1 or S2 were permitted to carry the inductive current and remain in a conductive state, it would immediately conduct current at the beginning of the next half cycle and not be delayed by the predetermined phase angle. Therefore excessive current would be passed therethrough which would probably be destructive of the switching devices.

The firing circuit FC is provided for generating firing pulses for the controlled switching devices S1 and S2 at the desired phase angle of the AC half cycles. Under normal operating conditions, when no excess current condition exists through the armature A, firing pulses will be generated at the predetermined phase angle required to supply the necessary voltage between the B+ and B− buses and current to the armature A for proper operation of the motor at the desired speed.

Also included in the system is a power supply PS1; a discharge circuit DS and a current limiting circuit CLC. The current limiting circuit CLC includes a transistor Q3 which is normally nonconductive under normal operating conditions of the motor M, that is, when there is no overcurrent condition. The transistor Q3 has a capacitor C2 connected between the collector and emitter electrodes thereof, the emitter electrode being connected to a reference line G which is connected to the terminal T5 of the power supply PS and acts as a ground reference for the circuitry to be described. The capacitor C2 is selected to be of a relatively large value and is charged from the +VE voltage at the terminal T3 via a resistor R19 and a diode D10. The charging of the capacitor C2, because of its relatively large capacitance, takes several half cycles of the input AC source VS. Assuming that the capacitor C2 has charged to its normal operating level the generation of the firing pulses under normal operating conditions for the controlled switch devices S1 and S2 will be discussed.

Figure 2:
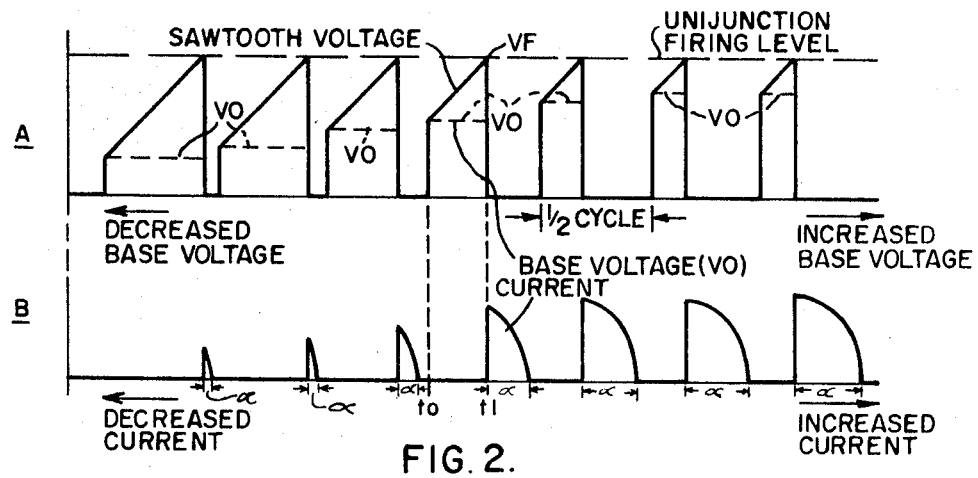
FIG. 2 is a waveform diagram including curves A and B used in the explanation of the operation of the system of FIG. 1.

Reference is now made to FIG. 2. Assume that the operation begins at a time *t*0. Further assume that capacitors C3, C4 and C5 connected in the firing circuit FC are discharged and are selected of much smaller value than the capacitor C2 of the current limiting circuit CLC so that these capacitors may rapidly charge. Also consider at this time that both of the controlled switching devices S1 and S2 are turned off and that the positive half cycle of the AC source VS is beginning at a time *t*0. At the time *t*0 the capacitor C3 is rapidly charged from the +VE source through the resistor R19. The charging at the time *t*0 is very rapid since the capacitor C3 is selected to have a small value of capacitance, with the capacitor C3 charging rapidly to a level VO as shown in curve A of FIG. 2. The capacitor C3 would continue to charge except for a transistor Q4, a diode D11 and a voltage divider network including resistors R10, R11 and R12. The voltage divider network R10, R11 and R12 s connected between the VB line and the reference line G with the resistor R11 comprising a potentiometer having its movable arm connected to the base of the transistor Q4. The collector of the transistor Q4 is connected to the line G and the emitter of the transistor Q4 is connected to the cathode of the diode D11 which has its anode connected to the top end of the capacitor C3. The transistor Q4 is thus connected in an emitter follower configuration with the base and emitter voltages tracking one another. The capacitor C3 will thus continue to charge until the voltage thereacross exceeds the voltage between the base and collector of transistor Q4 by the two forward junction drops of the diode D11 and the emitter-base junction of the transistor Q4. The base collector voltage of the transistor Q4 is controlled by the setting of the potentiometer R11. When the voltage across the capacitor C3 reaches the base-collector voltage of the transistor Q4 plus the two forward junction drops, the diode D11 and the emitter base circuit of the transistor Q4, and will be clamped to this value which is illustrated in curve A of FIG. 2 as the voltage VO.

Voltage VO across the capacitor C3 will thus be maintained during the remainder of the half cycle and will termed herein the base voltage as designated on curve A of FIG. 2. During the time that the capacitor C3 is charging, the capacitor C4 is also charging via the resistor R19 and a diode D12 to the voltage VO. Another charging path is provided to the capacitor C4 from the +VE voltage via a resistor R20. The resistor R20 is selected to be much larger than the resistor R19 and thereby provides a longer time constant for the continued charging of the capacitor C4. The resistor R20 is selected to have such a value that a substantially constant current will be provided therethrough so that capacitor C4 will be charged at a constant current in a substantially linear sawtooth manner from the time *t*o as shown in FIG. 2. Thus a sawtooth voltage is superimposed on the base voltage which increases from the base value VO toward a value VF along a substantially linear ramp. A capacitor C5 is also charged via the resistors R19 and R20 and a diode D13, and acts as a noise shunting capacitor for a programmed unijunction transistor PUT, being connected across this device from its anode to the reference line G.

The capacitor C3 does not continue to charge according to the sawtooth but remains clamped to the base voltage level VO via the emitter base circuit of the transistor Q4. The diode D12 is poled in a direction to block the current from being applied to the capacitor C3 from the resistor R20. The diode D13 is so poled to protect the programmed unijunction transistor PUT from having reverse voltages applied to the anode thereof.

The programmed unijunction transistor PUT may comprise any well-known type, for example, GE type D13T1. The programmed unijunction transistor PUT is designed to fire when its gate to cathode voltage reaches a predetermined value. This predetermined value is established by a voltage divider including a resistor R17 and a resistor R16 which are connected between a voltage VB, established by the power supply PS1, and the reference line G. The gate electrode of the PUT is connected between the junction of these resistors. The resistors R17 and R16 are selected to be precision resistors so that the voltage between the gate and the common line G is established accurately to insure the firing of the PUT at the desired voltage level.

The voltage VB is provided by the power supply PS1 which includes a transformer TF1 having its primary winding connected across input terminals T1 and T2 with power supply PS. The transformer TF1 has a center tapped secondary with the center tap thereof being connected to the common line G and a spike suppression capacitor C1 connected across the winding. Diodes D1 and D2 are connected across the secondary winding with their cathodes being commonly connected at a junction J1 to full-wave rectify the output of the secondary winding. The full-wave rectified output of the junction J1 is passed through a diode D3 with the voltage VB being established at the cathode of the diode D3 with respect to the common line G. A filter capacitor C6 is connected between the VB line and the line G.

The cathode of the programmed unijunction transistor is connected via a resistor R13 to the common line G. Whenever the voltage at the anode of the PUT exceeds the voltage at the gate thereof the PUT will fire discharging the capacitors C3, C4 and C5 therethrough, with firing pulses being generated in resistors R14 and R15 connected, respectively, between the cathode of the PUT and the gate terminals TG1 and TG2 of the controlled switching devices S1 and S2. As shown in curve A of FIG. 2, the unijunction firing level VF, that is, the anode voltage, is reached at a time *t*1 which causes gating pulses to be supplied to the controlled rectifier switching devices S1 and S2 at this time. Since it is assumed tat this is during the positive half cycle of the AC source VS, the controlled switching device S1 is turned on and will be conductive for the remainder of the positive half cycle for a time duration α as shown in curve B of FIG. 2.

At the end of the positive half cycle the controlled switching device S1 will be commutated off and no current will flow into the B+ bus from the AC source VS until the controlled switching device S2 is turned on. At the beginning of the negative half cycle capacitor C3 rapidly rises to the base voltage level VO and then is clamped thereto via the diode D11 an transistor Q4 to the voltage level as determined by the potentiometer R11. The sawtooth voltage begins to rise with the charging of the capacitor C4 until the unijunction firing level VF is reached. Firing pulses are then supplied to the controlled switching devices S1 and S2 with the device S2 being turned on to conduct current therethrough during the remainder of the negative half cycle. In such a fashion the normal operation of the firing circuit FC continues with firing pulses being delivered to the controlled switching devices S1 and S2 at a predetermined phase angle of the AC source VS so that each of the half cycles of the S1 or S2 is conducted for the predetermined conduction period α.

By adjusting the setting on the potentiometer R11 the base voltage level can be adjusted upwardly or downwardly in magnitude. By adjusting the potentiometer R11 so that the voltage at the base of the transistor Q4 is lower, the capacitor C3 is charged at a lower voltage and the sawtooth charging of the capacitor C4 begins at a lower voltage level and therefore requires a longer time to reach the unijunction firing level VF. This means that the PUT will not fire until later in the half cycle of the AC source VS so that less current is translated through the controlled switching devices S1 and S2 during each half cycle. Thus decreased current is supplied to the armature A of the motor M. This phenomena may be seen in curves A and B in FIG. 2. Looking to the left of the time t0 it is seen that as the base voltage is decreased, the conduction period α of the devices S1 and S2 is decreased thereby decreasing the current translated through the controlled switching devices S1 and S2. The potentiometer R11 thus controls the magnitude of the current supplied to the armature A and thereby acts as a speed control for the motor with the speed decreasing as the current is decreased. Conversely, as seen looking to the right of the time t0 in FIG. 2 if the base level voltage is increased by the adjustment of the potentiometer R11 to raise the base voltage of the transistor Q4, the capacitor C3 charges to a higher voltage before being clamped by the transistor Q4 and therefore the sawtooth waveform need only rise a short time before reaching the unijunction firing level VF which causes the PUT to fire and generate the firing pulses for the controlled rectifiers S1 and S2. Thus firing pulses are supplied to the controlled switching devices S1 and S2 earlier in their respective half cycles thereby increasing the conductive time interval α during which current is translated through the controlled switching devices S1 and S2 to the armature A. Hence, increased current is supplied to the motor armature A with a corresponding increase in motor speed.

Thus under normal nonoverload current conditions for the motor M firing pulses are generated by the firing circuit FC at a repetition rate as determined by the setting on the potentiometer R11. The firing pulses supplied to the controlled switching devices S1 and S2 from terminals TG1 and TG2 of the firing circuit FC determine the conductive time period α that these devices are conductive and therefore the amount of current supplied to the armature A and the motor speed.

The operation of the current limiting circuit CLC will now be described when an overload condition exists at the armature A of the motor M. As previously described the capacitor C2 is selected to have a relatively large capacitance value and is in a discharged condition at startup. It takes several cycles for the capacitor C2 to charge through the resistor R19 from the field voltage +VE which effectively limits the voltage applied to the programmed unijunction transistor PUT during the first few cycles after startup so that the firing circuit FC does not generate any firing pulses for the controlled switching devices S1 and S2.

Once the system is operating normally with the capacitor C2 charged to its normal operating voltage, if an overcurrent condition should exist, the current limiting circuit CLC is activated. A current transformer CT is utilized for sensing a current indicative of the current flow through the armature A. The current transformer includes a primary coil W1 which is coupled to the line A1 connecting the AC source to the input terminal T1 of the power supply bridge PS. The primary coil W1 thus senses the alternating current input to the power supply PS which is indicative of the load current being supplied to the diodes A. The AC current sensed by the primary coil W1 is transformed to a secondary winding W2 of the current transformer CT which supplies an output which is indicative of the load current through the armature A. A resistor R7 is connected across the secondary coil W2 and acts as a minimum load for the current transformer so that no excessive voltage appears across the output of the coil W2 and also serves to suppress noise spikes which might appear across the coil W2. The output of the secondary coil W2 is applied to a diode bridge which includes diodes D4, D5, D6 and D7 which are connected in a full-wave rectifier bridge configuration. The anodes of the diodes D6 and D7 are connected to the reference line G and a variable resistor R4 is connected between the cathodes of the diodes D4 and D5 and the reference line G so that a unidirectional control voltage VC is established across the output of the diode bridge. The resistor R4 may comprise a potentiometer and acts as a load resistor for the current transformer CT. By the adjustment of the resistor R4, the control voltage VC is established.

Connected between the control voltage line VC and the base of the transistor are two parallel paths. One path includes a resistor R9 and a Zener diode D9 and may be termed a slow response path. The other path includes a resistor R8 and a Zener diode D8 and may be termed a fast response path. A base emitter resistor R5 is connected between the base and emitter of the transistor Q3. The variable resistor R4 is so selected that under normal operating conditions neither of the Zener diodes D9 or D8 have sufficient control voltage VC applied thereto to exceed their breakover values. The Zener diode D9 is selected to have a lower breakover value, for example, 6 volts, as compared to the Zener diode D9 which is selected to have a higher breakover value of, for example, 9 volts. Also, the resistor R9 is selected to have a much higher resistance value than the resistor R8, for example, 20 times as high. The voltage VC under normal operating conditions is selected by the resistor R4 so as not to cause the Zener diode D9 to break over until the voltage VC exceeds a certain percentage, for instance, 150 percent, of its normal full load voltage. Thus the current limiting circuit CLC is not activated until a 150 percent current overload condition exists in the armature A which is sensed by primary coil W1 of the current transformer and transformed to the secondary coil W2 which causes a current flow to the resistor R4 to establish a control voltage VC of sufficient magnitude to break down the Zener diode D9 in the slow response path. Base drive current is thus provided via resistor R9 to the transistor Q3 which is rendered conductive to discharge slightly the capacitor C2 therethrough. The slight discharge of the capacitor C2 causes the base voltage to which the transistor Q4 clamps to be of a lower value than during the previous cycle (see FIG. 2 to the left of the time t0). With a lower base voltage a longer time is required for the sawtooth voltage superimposed on the base voltage to reach the unijunction firing level VF. Thus firing pulses are generated at a later time in the half cycle so that the conduction period α of the controlled switching devices S1 and S2 is made smaller thereby lowering the magnitude of current supplied to the motor of armature A during that half cycle as compared with that if no overcurrent should have appeared.

During subsequent half cycles the current supplied to the armature A will settle to a value just sufficiently in excess of the limit value to discharge slightly the capacitor C2 during the following half cycles until the motor M reaches the set speed. The current will thus be limited to the 150 percent overload condition until thermal overload breakers or other safety devices such as fuses are activated to remove the overload condition. The resistor R9 is selected to have a relatively large value so as to limit the base drive current supplied to the transistor Q3 and thereby limit the rate of discharge of the capacitor C2. Thus the current response of the system is limited which makes the control system very stable. This is of course highly desirable if only short term overcurrent conditions are encountered by the motor M so as not to disrupt the system during every short term overload.

Under high overload conditions, for example, 200 percent of rated load current, due to a locked rotor of the motor M, it would be highly desirable if the overload condition were removed from the motor within the quickest time possible, ideally within the next half cycle of the input AC. The use of the fast response path including the resistor R8 and the Zener diode D8 permits the rapid removal of input power to the armature A under such high overload conditions. Under these conditions of high overload, for instance, 200 percent overload, the Zener diode D8 breaks down providing base drive current through the resistor R8 which has a relatively low resistance value thereby supplying sufficient base current to the transistor Q3 to drive it into saturation and discharge the capacitor C2 through the collector emitter circuit thereof in one half half cycle. The rapid discharge of the capacitor C2 prevents firing pulses from being generated by the firing circuit FC since it requires several half cycles for the capacitor C2 to charge to a sufficiently high voltage to permit the unijunction firing level VF to be exceeded in a given half cycle.

Therefore, large overload current conditions are rapidly removed within the next half cycle which might otherwise be damaging to the semiconductor devices of the system if not immediately removed. Once the overload conditions are removed, the system may then be operated normally with the slow response path including the Zener D9 being operative to limit the overload condition and the fast response time path including the Zener D8 being responsive to large overload conditions to prohibit the generation of firing pulses to the controlled switching devices S1 and S2. By the adjustment of the resistor R4 in the current limiting circuit CLC, the current limiting setting may be adjusted to the desired percentage of normal load current for the armature A, the Zener diodes D9 and D8 being so selected to operate at the limits as set forth above. Also the current limiting value set by the resistor R4 may be selected to be less than normal full load current. Under these conditions the motor will provide a constant torque output with the speed of the motor varying to supply a constant torque. An overspeed limit will nonetheless be provided since if the load falls below a predetermined value the speed will be limited by the speed control setting. The system as described above thus may provide a constant speed with overcurrent (over torque) limiting action or a constant torque output with overspeed limiting action.

The discharge circuit DS is provided to insure the full discharge of the capacitor C3, C4 and C5 at the end of each half cycle of the AC input. The discharge circuit DS includes a transistor Q1 and a transistor Q2. Biasing resistors R1, R2 and R3 are provided, with resistors R1 and R2 being connected between the junction J1 and the reference line G and the base of the transistor Q1 being connected to the junction therebetween. The resistor R3 is connected between the collector-base junction of the transistors Q1 and Q2 and the VB line. The emitters of the transistors Q1 and Q2 are connected to the common line G, and the collector of the transistor Q2 is connected to the anode of the PUT. The transistor Q1 is normally biased on and the transistor Q2 is normally biased off until near the end of each half cycle of the AC as it approaches zero. When the half cycle approaches zero, for example, +1 volt, insufficient base drive is supplied to the transistor Q1 to maintain it on. Thus the transistor Q1 turns off permitting the transistor Q2 to turn on with base drive being supplied via the resistor R3 thereto. The value of the resistor R3 is so selected to permit transistor Q2 to be driven hard into saturation which causes the capacitors, C3, C4 and C5 to be rapidly discharged therethrough. As the next half cycle goes positive again the transistor Q1 is turned on, thus turning off the transistor Q2 with this state continuing until the end of the half cycle as the voltage approaches zero.

It is necessary that the capacitors C3, C4 and C5 be discharged in order to prevent motor clogging at low speeds. If these capacitors were not discharged at the end of each half cycle, whenever low current, at small conduction angles $\alpha$, is supplied to the motor armature A, the voltage on the capacitors would build up over several cycles which would cause firing pulses to be generated, for example, every other half cycle, at an early phase angle which would cause a large current flow through the controlled switching devices S1 and S2 every other half cycle thereby causing the motor to try to turn rapidly every other half cycle. This undesirable condition is removed by the use of the discharge circuit DS including the transistors Q1 and Q2.

It is thus seen that a very desirable control system is provided which is highly efficient in that it does not require a resistor in series with the load current of the motor. Also the system is relatively low in cost since the current transformer can be produced very economically since it only requires a 5 to 10 percent accuracy. An additional advantage is provided in that the system is adjustable over a wide range by the selection of the resistors R7 and R4. For example, a 50 to 1 range of control may be obtained with a change of 1 to 50 amps. An important advantage of the system is that it is highly stable. The slow response path including the Zener D9 permits the system to respond slowly under light overload conditions while under severe overload conditions the fast response including the Zener D9 takes over and rapidly removes the overload condition from damaging the semiconductor devices or other circuit components.

Although the present invention has been described with a certain degree of particularity, it should be understood that the present disclosure has been made only by way of example and that numerous changes in the details of circuitry and the combination and arrangement of parts, elements and components can be resorted to without departing from the spirit and the scope of the present invention.

We claim:

1. In a system for limiting the current to a motor operative with a controlled power supply including controlled switching devices for converting an AC input to a DC output, the combination of:

firing circuit means for generating firing pulses for controlling the conductive period of said controlled switching devices so that a selected current is normally supplied to said motor, said firing circuit means including means for generating a base voltage, means for generating a sawtooth voltage and means for combining said base and sawtooth voltages, said firing pulses being generated when the combined base and sawtooth voltages exceed a predetermined level;

sensing means for sensing a current related to the actual magnitude of the current through said motor; and current responsive means responsive to the actual magnitude of the current through said motor when it exceeds a preselected magnitude for varying said base voltage in response thereto so that said firing pulses are generated in such a fashion to limit the actual current magnitude, said current responsive means comprising a limiting capacitor operative to limit the magnitude of said base voltage and a limiting device operatively connected to said limiting capacitor and being operative when said preselected magnitude of current is exceeded to discharge said limiting capacitor to decrease thereby the magnitude of said base voltage and thereby delay the generation of said firing pulses by said firing circuit means.

2. The combination of claim 1 wherein:

said sensing means includes a current transformer for sensing the AC current flow from said AC input which is indicative of the actual magnitude of the current through said motor.

3. The combination of claim 1 wherein said firing circuit means includes a clamping device, a base capacitor, a sawtooth capacitor, and means for establishing the clamping level of said clamping device, said base capacitor charging until said clamping level is reached wherein said clamping device is operative to clamp to that voltage and establish said base voltage, said sawtooth capacitor charging to establish said sawtooth voltage until said predetermined level is exceeded.

4. The combination of claim 3 wherein said firing circuit means includes a unijunction transistor device which is operative to be fired and provide said firing pulses whenever the combined base and sawtooth voltages exceed said predetermined level.

5. The combination of claim 4 includes:
a discharge circuit for discharging said base and sawtooth capacitors at the end of each half cycle of said AC input.

6. The combination of claim 3 wherein:
said sensing means includes a current transformer for sensing the AC current flow from said AC input which is indicative of the actual magnitude of the current through said motor and providing an output in response thereto, and
said current responsive means includes rectifier means for receiving the output of said current transformer and providing a unidirectional control output, and load means for controlling the magnitude of said control output for determining said preselected magnitude of current.

7. The combination of claim 1 wherein:
said current responsive means includes
a slow response circuit and a fast response circuit respectively operatively connected to said limiting device,
said slow response circuit responsive to activate said limiting device when said preselected magnitude of current is exceeded to discharge said limiting capacitor to a degree necessary to limit said current to a predetermined overcurrent level,
said fast response circuit responsive to activate said limiting device when said preselected magnitude of current is exceeded by a certain amount to discharge rapidly said limiting capacitor so that no firing pulses are generated by said firing circuit means.

8. The combination of claim 7 wherein said firing circuit means includes
a clamping device, a base capacitor, a sawtooth capacitor, and means for establishing the clamping level of said clamping device,
said base capacitor charging until said clamping level is reached wherein said clamping device is operative to clamp to that voltage and establish said base voltage,
said sawtooth capacitor charging to establish said sawtooth voltage until said predetermined level is exceeded.

9. The combination of claim 8 wherein:
said sensing means includes a current transformer for sensing the AC current flow from said AC input which is indicative of the actual magnitude of the current through said motor and providing an output in response thereto, and
said current responsive means includes rectifier means for receiving the output of said current transformer and providing a unidirectional control output, and load means for controlling the magnitude of said control output for determining said preselected magnitude of current.

10. The combination of claim 8 includes:
a discharge circuit for discharging said base and sawtooth capacitors at the end of each half cycle of said AC input.

11. The combination of claim 8 wherein said firing circuit means includes
a unijunction transistor device which is operative to be fired and provide said firing pulses whenever the combined base and sawtooth voltages exceed said predetermined level.

12. The combination of claim 1 wherein:
said sensing means includes a current transformer for sensing the AC current flow from said AC input which is indicative of the actual magnitude of the current through said motor and providing an output in response there, and
said current responsive means includes rectifier means for receiving the output of said current transformer and providing a unidirectional control output, and load means for controlling the magnitude of said control output for determining said preselected magnitude of current.